(12) United States Patent
Dosovitsky et al.

(10) Patent No.: US 10,554,517 B2
(45) Date of Patent: Feb. 4, 2020

(54) REDUCTION OF VOLUME OF REPORTING DATA USING CONTENT DEDUPLICATION

(71) Applicant: A10 Networks, Inc., San Jose, CA (US)

(72) Inventors: Gennady Dosovitsky, Sunnyvale, CA (US); Rajkumar Jalan, Saratoga, CA (US)

(73) Assignee: A10 Networks, Inc., San Jose, CA (US)

( * ) Notice: Subject to any disclaimer, the term of this patent is extended or adjusted under 35 U.S.C. 154(b) by 240 days.

(21) Appl. No.: 15/471,858

(22) Filed: Mar. 28, 2017

(65) Prior Publication Data

US 2018/0285372 A1 Oct. 4, 2018

(51) Int. Cl.
G06F 16/30 (2019.01)
H04L 12/26 (2006.01)
G06F 16/28 (2019.01)

(52) U.S. Cl.
CPC .......... *H04L 43/062* (2013.01); *G06F 16/285* (2019.01)

(58) Field of Classification Search
CPC ............................. H04L 43/062; G06F 16/285
See application file for complete search history.

(56) References Cited

U.S. PATENT DOCUMENTS

| | | | | |
|---|---|---|---|---|
| 2003/0176182 A1* | 9/2003 | Cerami | ................ | G06Q 20/102 455/414.1 |
| 2005/0091545 A1* | 4/2005 | Soppera | .................. | G06F 21/64 726/19 |
| 2006/0116989 A1* | 6/2006 | Bellamkonda | .... | G06F 16/24556 |
| 2009/0265455 A1* | 10/2009 | Hiraki | ................. | H04L 61/2038 709/223 |
| 2010/0070343 A1* | 3/2010 | Taira | .................... | G06Q 10/067 705/400 |
| 2011/0059748 A1* | 3/2011 | Taylor | ..................... | H04W 4/02 455/456.1 |
| 2011/0196837 A1* | 8/2011 | Savunen | ............... | G06F 16/242 707/634 |
| 2011/0265109 A1* | 10/2011 | Goyet | ..................... | H04L 43/04 725/9 |
| 2012/0069797 A1* | 3/2012 | Lim | ...................... | H04W 28/18 370/328 |

(Continued)

*Primary Examiner* — Tarek Chbouki
(74) *Attorney, Agent, or Firm* — Keith Kline; The Kline Law Firm PC

(57) ABSTRACT

Decreasing data transfer over a network may commence with collecting subscriber data. The method may continue with classifying the subscriber data into low frequency change data and high frequency change data based on predetermined criteria. The method may include storing the low frequency change data to a data storage. The method may continue with generating reporting data. The reporting data may include the high frequency change data and at least one data index pointer to the low frequency change data in the data storage. The method may further include providing the reporting data to a data processing node. The low frequency change data may include subscriber identifying data. The data reporting node may be further configured to obfuscate the subscriber identifying data. The at least one data index pointer may include a secure data identifier associated with the obfuscated subscriber identifying data.

16 Claims, 9 Drawing Sheets

(56) References Cited

U.S. PATENT DOCUMENTS

| | | | |
|---|---|---|---|
| 2014/0052814 A1* | 2/2014 | Graham | H04L 67/2842 709/217 |
| 2014/0089342 A1* | 3/2014 | Takayanagi | G06F 16/211 707/769 |
| 2014/0201318 A1* | 7/2014 | Dajani | H04L 69/16 709/217 |
| 2015/0293817 A1* | 10/2015 | Subramanian | G06F 16/184 707/645 |
| 2017/0041021 A1* | 2/2017 | Karkkainen | H03M 7/3084 |

* cited by examiner

| Subscriber Obfuscated Identifier | Primary Subscriber Identity | Network Identity | Subscriber Location | Policy |
|---|---|---|---|---|
| sdfsdfsj4323 | 4082223333 | 192.168.1.1 | Location 1 | Gold |
| Sdfsd&*(*^22 | 4081119999 | 192.168.1.2 | Location 2 | Silver |

REDUCTION OF VOLUME OF REPORTING DATA USING CONTENT DEDUPLICATION

TECHNICAL FIELD

This invention relates generally to data networks and more particularly to reduction of volume of reporting data.

BACKGROUND

Service providers may provide services to a plurality of subscribers in a data network. When providing the services, the service providers may need to collect reporting data related to network and subscriber behavior. The amount of reporting data has been rising tremendously due to the growth of throughput of the network devices, number of subscribers, and a demand for high granularity of the reporting data collected by network devices servicing the subscribers. Each network device may deliver specific information based on functions and location of the network device, number or subscribers to be serviced, and other parameters. Furthermore, the network devices may deliver records and notifications including event-driven and aggregated records and notifications. When multiple network devices provide the reporting data at a high speed, an aggregate throughput may need to be increased for management ports. The network devices may require additional central processing unit time for formatting and outputting the reporting data. Furthermore, a volume of the reporting data generated by the network device can exceed the capacity of a management port managing operations of the network devices. To respond to this demand, centralized analytics and reporting systems may need to scale out and provide more network and computational resources for receiving and processing the growing amount of the reporting data. However, bringing in additional network and computational resources may be time and cost consuming and eventually increase the price of the services provided by the service providers.

Furthermore, multiple records in the reporting data collected by the network devices are duplicates and, therefore, redundant data is often collected and processed. Network and computational resources may be wasted on collecting and processing the redundant data.

Additionally, the reporting data collected by the network devices may contain subscriber identity and location information. The subscriber identity and location information may be visible in data records of the reporting data while they are transferred between the network devices in the data network. The data records containing the subscriber identity and location information may become a target for intercepting by malicious agents, which may extract the subscriber identity and location information from the intercepted data records. Therefore, the subscriber identity and location information can become compromised. The malicious agents can use the subscriber identity and location information, such as any parameters allowing attributing the reporting data to a source of data traffic, for various fraudulent purposes.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for decreasing data transfer over a network. According to one approach of the present disclosure, a system for decreasing data transfer over a network is provided. Specifically, the system may include a data collecting node and a data reporting node. The data collecting node may be configured to collect subscriber data and classify the subscriber data into low frequency change data and high frequency change data based on predetermined criteria. The data collecting node may be further configured to store the low frequency change data to a data storage. The data reporting node may be configured to generate reporting data including the high frequency change data and at least one data index pointer to the low frequency change data in the data storage. The data reporting node may be further configured to provide the reporting data to a data processing node.

According to another approach of the present disclosure, a method for decreasing data transfer over a network is provided. The method may commence with collecting subscriber data and classifying the subscriber data into low frequency change data and high frequency change data based on predetermined criteria. The method may include storing the low frequency change data to a data storage. The method may continue with generating reporting data. The reporting data may include the high frequency change data and at least one data index pointer to the low frequency change data in the data storage. The method may further include providing the reporting data to a data processing node.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

FIG. 6 is a block diagram illustrating subscriber obfuscated identifiers.

DETAILED DESCRIPTION

Figure 1:
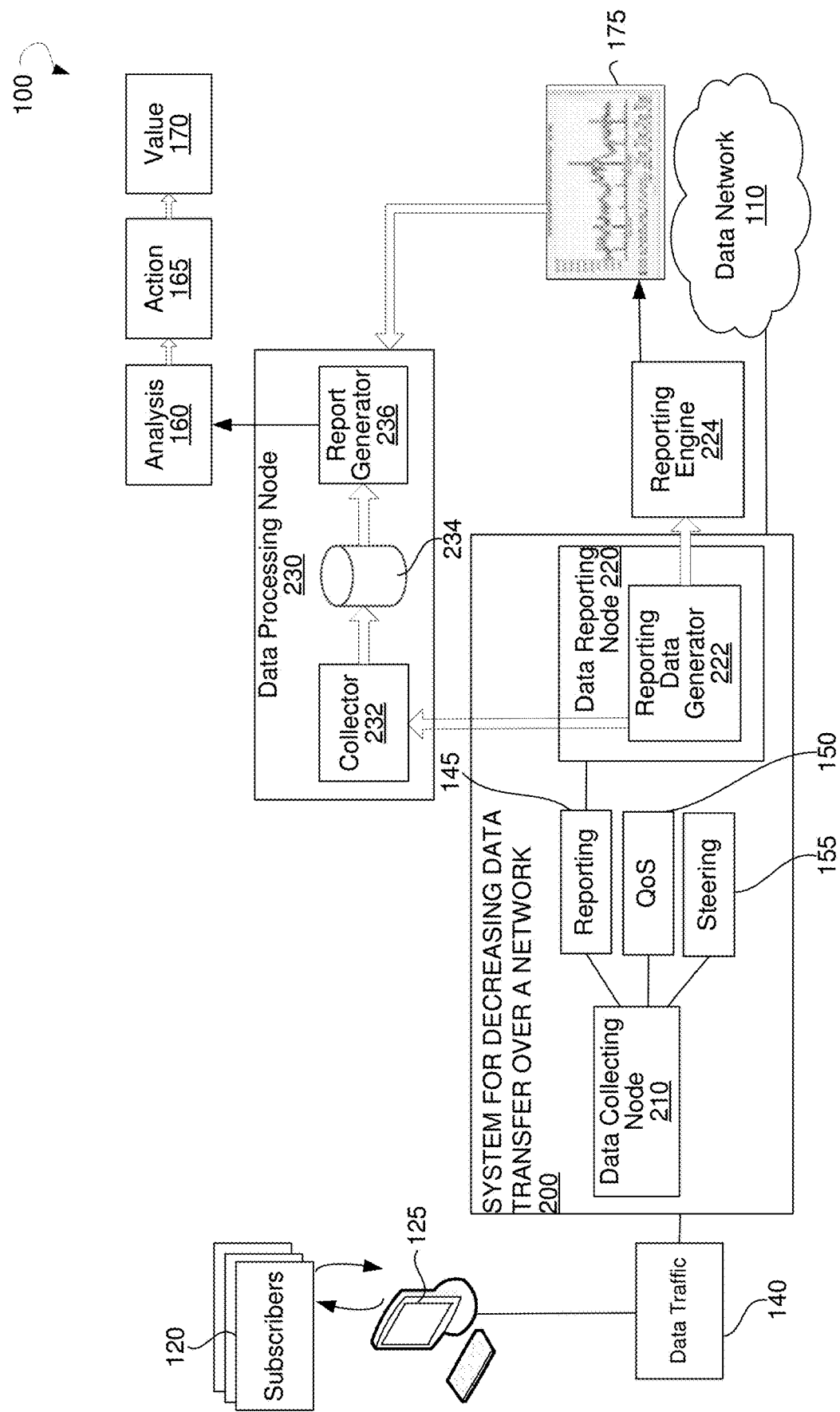
FIG. 1 shows an environment, within which methods and systems for decreasing data transfer over a network can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Embodiments of the disclosure disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to decreasing data transfer over a network. Subscriber data may be collected, consolidated, and analyzed to understand a data network state and subscriber behavior within a data network. The subscriber data can include metrics and statistics related to data traffic transferred between subscribers and a plurality of servers. A plurality of network devices can deliver specific subscriber data based on functions, location, and other capabilities of the network devices. A portion of the subscriber data, also referred to as low frequency change data, can be identical, i.e., duplicate, for all collected data records associated with the same subscriber or may change infrequently (e.g., when a status of a subscriber registration in the data network changes). In an example embodiment, a portion of identical information or semi-permanent information that changes infrequently may reach 80 percent of the volume of the subscriber data. Another portion of the subscriber data, also referred to as high frequency change data, may be different for each collected data record of the subscriber data.

A network device of a system for decreasing data transfer over a network can classify the collected subscriber data into the low frequency change data and the high frequency change data. The classification may be made based on predetermined criteria. The low frequency change data may be stored to a data storage. Furthermore, a data index pointer may be generated for the low frequency change data. The data index pointer may comprise a link to the low frequency change data in the data storage.

Using the high frequency change data and the data index pointer, the network device may generate reporting data. The reporting data may include the high frequency change data and the data index pointer. The size of the data index pointer is smaller than a size of the low frequency change data and, therefore, the size of the generated reporting data is smaller than the size of the collected subscriber data. In other words, the size of the subscriber data to be sent to a data processing node for further processing and analyzing may be reduced by generating the reporting data, in which the low frequency change data are replaced with the data index pointer. Additionally, granularity and accuracy of the high frequency change data delivered to the data processing node and of the low frequency change data stored to the data storage is not lost and remain the same as the granularity and accuracy of the collected subscriber data. Furthermore, there are no delays in delivering the reporting data to the data processing node because replacement of the low frequency change data with the data index pointer can be performed in real time.

The data processing node can receive the reporting data and use the data index pointer to obtain the low frequency change data from the data storage. The data processing node can combine the low frequency change data from the data storage and the high frequency change data from the reporting data to restore the subscriber data.

According to one embodiment of the present disclosure, the low frequency change data may include subscriber identifying data, or subscriber identity data, subscriber location data, and other sensitive subscriber data that may be a target for intercepting by malicious agents. To prevent compromising the sensitive subscriber data, the low frequency change data can be anonymized and protected. More specifically, upon receipt of the subscriber data, the network device may obfuscate the subscriber identifying data by generating a secure data identifier based, for example, on the subscriber identifying data. For example, a secure data identifier may be generated based on parameters predetermined by a service provider. The network device may further use the high frequency change data from the subscriber data and the secure data identifier to generate the reporting data to be sent to the data processing node. The reporting data can include the high frequency change data and the secure data identifier. Both the subscriber identifying data and the secure data identifier generated for the subscriber identifying data can be stored to a secure table in the data storage. The network device may send the reporting data to the data processing node.

The data processing node can receive the reporting data and use the secure data identifier to request the subscriber identifying data. In response to a request including the secure data identifier, the data processing node can receive the subscriber identifying data associated with the secure data identifier. The subscriber identifying data can be provided to the data processing node via a secure channel, which can be different from the data channel over which the reporting data is sent to the data processing node. Therefore, because the reporting data sent to the data processing node does not include any sensitive subscriber data, the intruders would be unable to intercept the sensitive subscriber data.

Additionally, as the size of the secure data identifier is smaller than a size of the subscriber identifying data, the size of the generated reporting data is smaller than the size of the collected subscriber data. In other words, the size of the subscriber data to be sent to the data processing node is reduced by generating the reporting data in which the subscriber identifying data are replaced with the secure data identifier.

Referring now to the drawings, FIG. 1 illustrates an environment 100 within which methods and systems for decreasing data transfer over a network can be implemented. The environment 100 may include a data network 110 (e.g., a computing cloud), subscribers 120, subscriber devices 125, and a system 200 for decreasing data transfer over a network also referred to as a system 200. The subscribers 120 and the system 200 may be connected via the data network 110.

The subscribers 120 may include a person who uses services provided over the data network 110. The subscribers 120 may be associated with the subscriber devices 125. The subscriber devices 125 may include a personal computer (PC), a laptop, a smartphone, a tablet PC, a television set, a mobile phone, an Internet phone, a netbook, a home gateway, a broadband gateway, a network appliance, a set top box, a media server, a personal media player, an access gateway, a networking switch, a server computer, a network storage computer, and so forth. When using the services, the subscribers 120 may use the subscriber devices 125 to send and receive data traffic 140 over the data network 110.

The data network 110 may be not limited to the computing cloud but may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network 110 may include a network of data processing nodes, also referred to as network nodes that may be interconnected for the purpose of data communication.

The system 200 may include a data collecting node 210 and a data reporting node 220. The data collecting node 210 may be responsible for collecting subscriber data associated with the data traffic 140. The subscriber data may include any data associated with the subscribers 120, the subscriber devices 125, and the data traffic 140. More specifically, the subscriber data may include data associated with activity of the subscribers 120 within the data network 110, such as subscriber-specific information, an amount of the data traffic 140, parameters of the data network 110, and so forth.

In an example embodiment, the data collecting node 210 can process the data traffic 140, extract parameters associated with the data traffic 140, and gather and accumulate metrics and statistics associated with the subscribers 120 and/or the data traffic 140. The data collecting node 210 may be responsible for performing reporting shown in a block 145, determining and/or providing quality of service (shown in a block 150) associated with the data traffic 140, steering the data traffic (shown in a block 155), and so forth. The data collecting node 210 may provide the collected subscriber data to the data reporting node 220.

The data reporting node 220 may include a reporting data generator 222. The reporting data generator 222 of the data reporting node 220 may receive the subscriber data from the data collecting node 210 as reporting records. The reporting data generator 222 may format and/or restructure the reporting records and send the reporting records to the data processing node 230. In an example embodiment, the data reporting node 220 may send the reporting records to a reporting engine 224. The reporting engine 224 may be an external reporting engine, e.g. a reporting engine that is not part of the system 200. The reporting engine 224 may be configured to perform a real-time reporting and an offline reporting. Specifically, the reporting engine 224 may provide data associated with the reporting records as a report 175. In an example embodiment, the report 175 may be provided in a form of a diagram illustrating the data associated with the reporting records. The reporting engine 224 may send the report 175 to the data processing node 230.

In an example embodiment, the data processing node 230 may be configured as a centralized reporting platform configured to perform analysis of the reporting records. The data processing node 230 may analyze the reporting records offline, i.e. not in real-time during collection of the reporting records. The data processing node 230 may include a collector 232, a storage node 234, and a report generator 236. The collector 232 of the data processing node 230 may receive the reporting records from the data reporting node 220. The reporting records may be stored in the storage node 234. The report generator 236 of the data processing node 230 may perform an analysis 160 of the reporting records. In some example embodiments, the data processing node 230 may further receive, from the reporting engine 224, the data associated with the reporting records as the report 175. The data processing node 230 may further analyze the report 175. Based on the analysis 160, actions 165 to be taken based on analyzing the behavior of the subscribers 120 and the data network 110 may be determined. Furthermore, value 170 associated with servicing of the subscribers 120 may be determined.

Figure 2:
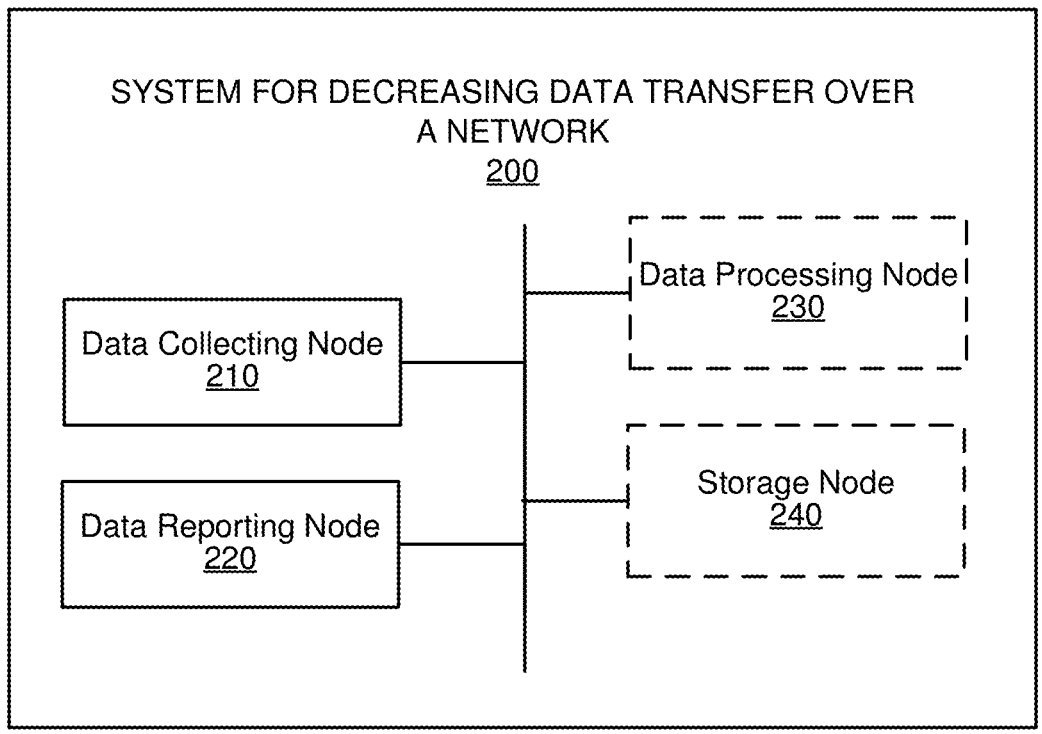
FIG. 2 shows a block diagram illustrating various modules of a system for decreasing data transfer over a network.

FIG. 2 shows a block diagram illustrating various modules of a system 200 for decreasing data transfer over a network, according to an example embodiment. Specifically, the system 200 may include a data collecting node 210, a data reporting node 220, and optionally a data processing node 230 and a storage node 240.

The data collecting node 210 may be configured to collect subscriber data. Upon collecting the subscriber data, the data collecting node 210 may classify the subscriber data into low frequency change data and high frequency change data based on predetermined criteria. The data collecting node 210 may be further configured to store the low frequency change data to a data storage. The data storage may include the storage node 240.

Figure 3:
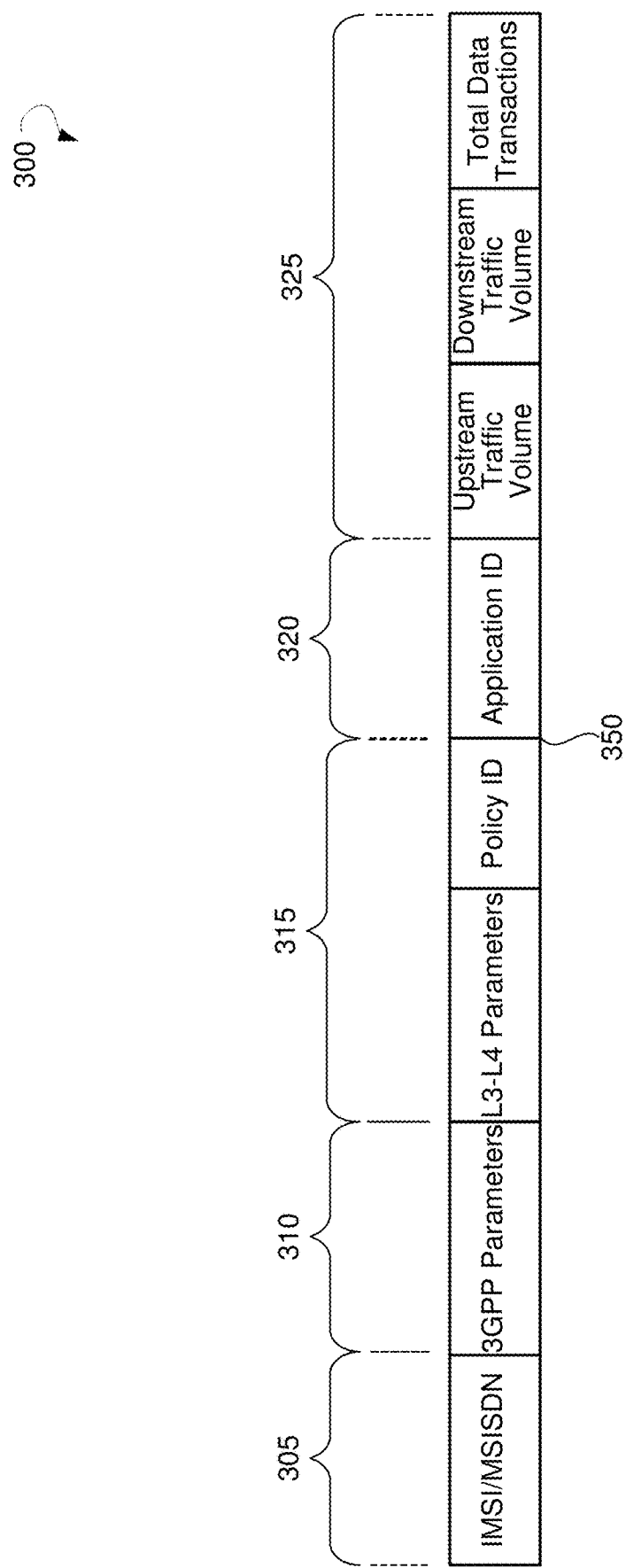
FIG. 3 is a block diagram illustrating subscriber data collected by a system for decreasing data transfer over a network.

FIG. 3 is a block diagram 300 illustrating the subscriber data collected by the system 200, according to an example embodiment. The subscriber data may be collected in a form of a plurality of reporting records. A reporting record 350 may have a plurality of data fields 305, 310, 315, 320, and 325. The data fields 305, 310, 315, 320, and 325 may include different types of data: data that may be permanent for the same subscriber, data that may change infrequently, data that may be different for different applications used by the subscriber, and data that may be different in each of the plurality of reporting records. More specifically, the data field 305 may include a Mobile Subscriber Integrated Services Digital Number (MSISDN) or an International Mobile Subscriber Identity (IMSI), which may be permanent for the same subscriber. The data field 310 may include 3rd Generation Partnership Project (3GPP) parameters. The data fields 315 may include Layer 3-Layer 4 (L3-L4) parameters (e.g., Internet Protocol (IP) addresses, Transmission Control Protocol ports, User Datagram Protocol ports, and so forth). More specifically, Layer 3 may include a network layer providing transfer of variable length data sequences from one node to another connected to the same data network. Layer 4 may include a transport layer providing transfer of variable length data sequences from a source to a destination host via one or more data networks. The data fields 315 may further include a policy identifier (ID) associated with the subscriber. The data fields 315 may change infrequently for the same subscriber. The data field 320 may include an application ID associated with the subscriber, which may be different for each application. The data fields 325 may include an upstream traffic volume sent by the subscriber, a downstream traffic volume received by the subscriber, and total number of data transactions associated with the subscriber. The data in the data fields 325 may be different for each reporting record associated with the subscriber.

The data collecting node may analyze the frequency of changing data in each of the data fields 305, 310, 315, 320, and 325. Based on the analysis performed according to predetermined criteria, the data collecting node may classify the data of the data fields 305 and 310 to be the low frequency change data and may classify the data of the data fields 315, 320, and 325 to be the high frequency change data.

Referring again to FIG. 2, the data collecting node 210 may be configured to provide the subscriber data, namely the low frequency change data and high frequency change data, to the data reporting node 220. The data reporting node 220 may be configured to generate reporting data based on the subscriber data. More specifically, the data reporting node 220 may generate at least one data index pointer to the low frequency change data in the data storage. The reporting data generated by the data reporting node 220 may include the high frequency change data and the at least one data index pointer to the low frequency change data. In an example embodiment, the data index pointer may include a reference to the low frequency change data in the data storage. The data reporting node 220 may be configured to provide the reporting data to the data processing node 230.

Figure 4:
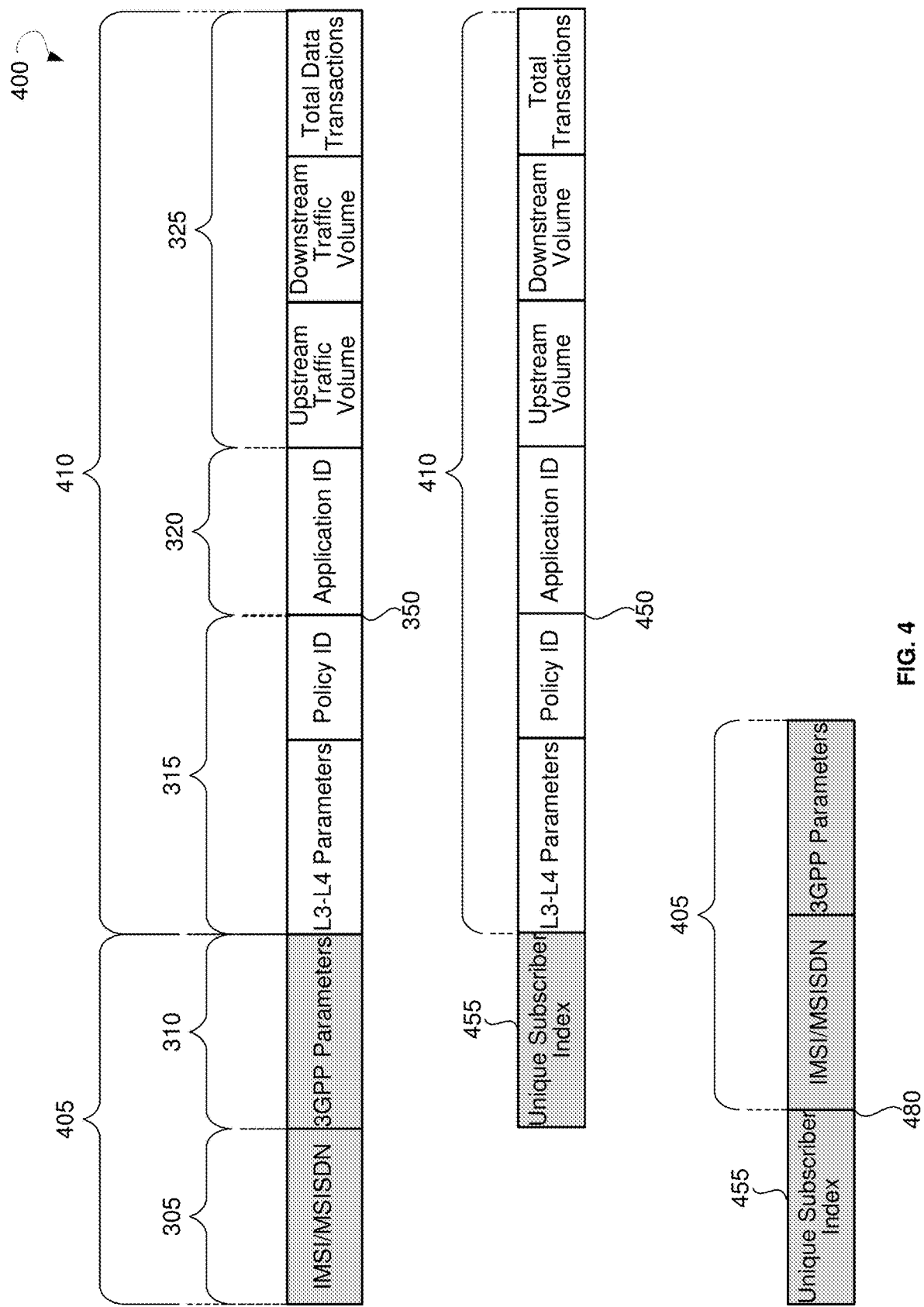
FIG. 4 is a block diagram showing reporting data generated based on subscriber data.

FIG. 4 is a block diagram 400 showing reporting data generated based on subscriber data, according to an example embodiment. Since some data fields of the reporting records 350 associated with the same subscriber may be identical, sending of a plurality of the reporting records 350 having identical data fields may result in sending redundant data. To avoid sending the redundant data, the identical data fields may be deduplicated. More specifically, the data reporting node may analyze data fields of the reporting record 350 and may determine data fields 305 and 310 to be low frequency change data 405. Furthermore, the data reporting node may determine data fields 315, 320, and 325 to be high frequency change data 410. The data reporting node may further generate a data index pointer, also referred to as a unique subscriber index 455, to the low frequency change data 405. Based on the unique subscriber index 455 and the high frequency change data 410, reporting data may be generated in a form of a reporting record 450. More specifically, the data reporting node may generate the reporting record 450 by replacing the data fields 305 and 310, which may be the low frequency change data 405, with a data field including the unique subscriber index 455. Therefore, the generated reporting data shown as the reporting record 450 may include the unique subscriber index 455 and the high frequency change data 410.

The data reporting node may store data of data fields 480, namely the unique subscriber index 455 and the low frequency change data 405, to the storage node. The data fields 480 may be stored to the storage node once for each subscriber. In a further example embodiment, the data fields 480 may be refreshed in the storage node in case the low frequency change data 405 of the subscriber changes. In an example embodiment, the low frequency change data 405 associated with the subscriber may change in case the subscriber changes a geographical location of the subscriber, replaces a subscriber device, uses additional subscriber devices, registers and deregisters in services provided by a service provider, and so forth.

Referring again to FIG. 2, in an example embodiment, the data reporting node 220 may be configured to receive a request from the data processing node 230. The request may include the at least one data index pointer to the low frequency change data in the data storage. In response to the request, the data reporting node 220 may provide the low frequency change data to the data processing node 230.

In an example embodiment, the data processing node 230 may use the at least one data index pointer as a reference to the low frequency change data in the data storage. Therefore, the low frequency change data may be accessed in the data storage by the data processing node 230 using the at least one data index pointer. The data processing node 230 may be configured to restore the subscriber data by combining the low frequency change data obtained from the data storage with the high frequency change data obtained from the reporting data.

The data reporting node 220 may be further configured to provide the low frequency change data to the data processing node 230 at a predetermined frequency. In a further example embodiment, the data reporting node 220 may be configured to provide the low frequency change data to the data processing node 230 in response to a determination that the low frequency change data has changed.

In an example embodiment, the low frequency change data of the subscriber data may include subscriber identifying data. The subscriber identifying data may include at least one of the following: a subscriber primary unique identifier, an MSISDN, an IMSI, a user name, a subscriber network identity, a phone number, a media access control (MAC) address, a public IP address, a private IP address, Virtual Local Area Network Identifier (VLAN ID), a vehicle identification number (VIN), a subscriber location information, a tunnel ID, 3GPP location information, subscriber group information, a policy associated with a subscriber, a subscriber location, a source of data traffic, a device type, an Operating System (OS) type, information describing the subscriber, information describing a group of subscribers, information describing at least one of a device, a host, a household, a data channel, and a neighborhood, and so forth. The device type and the OS type may be associated with a subscriber device.

In this embodiment, the data reporting node 220 may be further configured to convert the subscriber identifying data into a form preventing interceptors from revealing the subscriber identifying data in the reporting data. The data reporting node 220 may obfuscate the subscriber identifying data, thereby obtaining obfuscated subscriber identifying data. More specifically, the subscriber identifying data may be obfuscated by generating a secure data identifier based on the subscriber identifying data. In this embodiment, the at least one data index pointer may be the secure data identifier associated with the obfuscated subscriber identifying data. The secure data identifier may be calculated based on one more predetermined parameters. Therefore, the obfuscation of the subscriber identifying data may include encryption of the subscriber identifying data by calculating the secure data identifier for the subscriber identifying data based on predetermined obfuscation and encryption rules. The data collecting node 210 may be further configured to store the subscriber identifying data and the secure data identifier to a secure table in the data storage.

The reporting data generated by the data reporting node 220 may include the high frequency change data and the secure data identifier associated with the obfuscated subscriber identifying data. The data reporting node 220 may provide the reporting data to the data processing node 230 over a data channel. The data processing node 230 may receive the reporting data from the data reporting node 220 and may access the subscriber identifying data in the secure table over a secure channel. The secure channel may differ from the data channel over which the reporting data are provided to the data processing node 230. The data processing node 230 may use the secure data identifier to find the subscriber identifying data in the secure table. The data processing node 230 may be configured to restore the subscriber identifying data based on the secure data identifier.

The data reporting node 220 may be further configured to receive a request, from the data processing node 230, to provide the subscriber identifying data based on the secure data identifier. In response to the request, the data reporting node 220 may provide the subscriber identifying data to the data processing node 230 via the secure channel.

In an example embodiment, the obfuscating of the subscriber identifying data may be performed in response to a change in a subscriber registration status. More specifically, the subscriber may change the subscriber registration status by selecting a specific policy type to be applied to the subscriber. The policy type may include a protective service associated with protection of the subscriber's privacy. More specifically, when a service provider provides the protective service to the subscriber, the subscriber identifying data may be obfuscated in all reporting records associated with the subscriber.

In a further example embodiment, the obfuscation of the subscriber identifying data may be performed using a one-stage obfuscation when a secure data identifier is generated based on the subscriber identifying data. In a further example embodiment, the obfuscation of the subscriber identifying data may be performed using a two-stage obfuscation. The two stages of the two-stage obfuscation may include: generation of a first-level secure data identifier based on the subscriber identifying data to obfuscate the subscriber identifying data, and generation of a second-level secure data identifier based on the first-level secure data identifier to obfuscate the first-level secure data identifier. The association between the subscriber identifying data, the first-level secure data identifier, and the second-level secure data identifier may be stored to the secure table.

The storage node 240 may be configured to store the low frequency change data, the at least one data index pointer to the low frequency change data, and any other data needed for generating and processing the reporting data. In an example embodiment, the storage node 240 may be a secure data storage and may be configured to store the obfuscated subscriber identifying data and the secure data identifier in the secure table.

Figure 5:
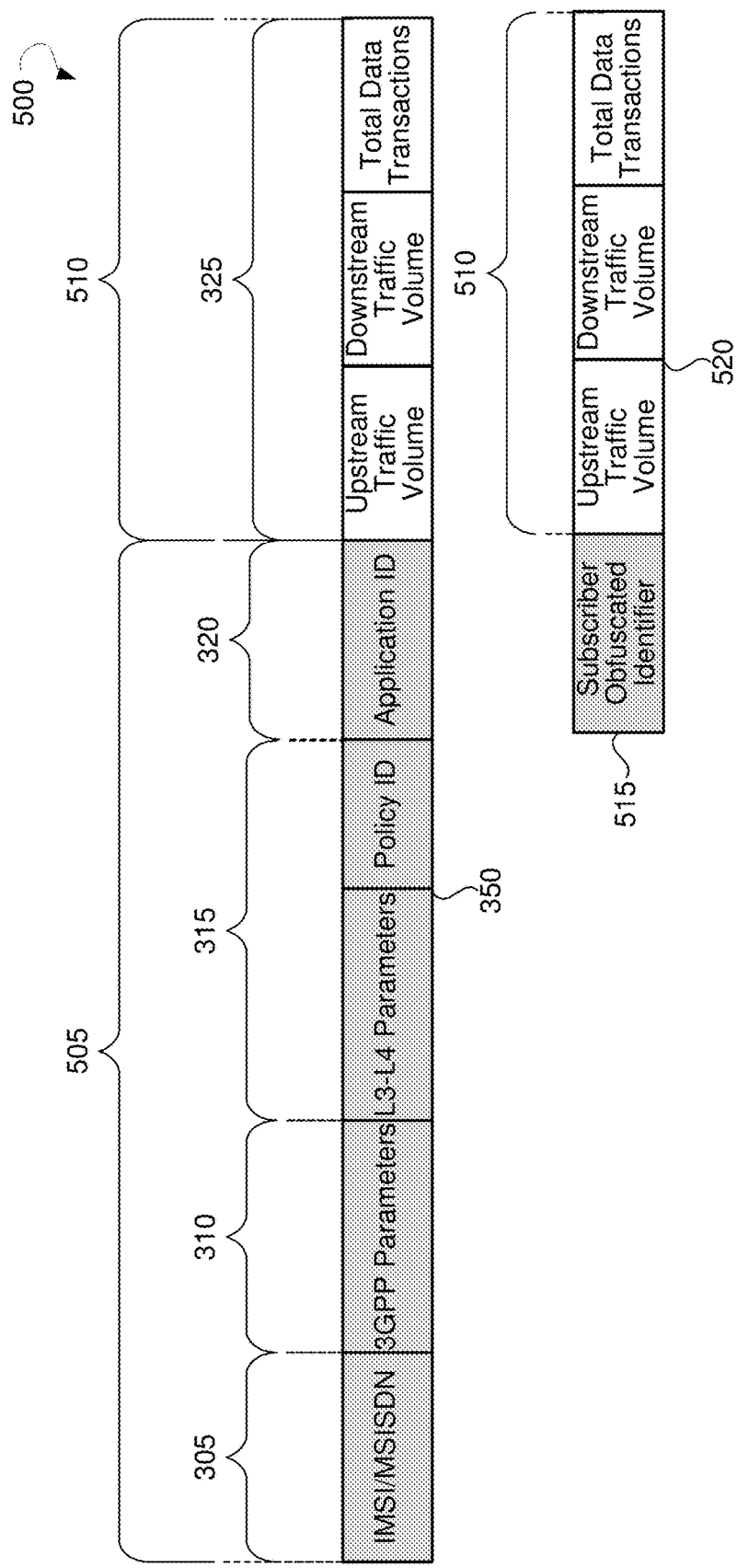
FIG. 5 is a block diagram illustrating obfuscation of subscriber identifying data.

FIG. 5 is a block diagram 500 showing obfuscating subscriber identifying data, according to an example embodiment. The data reporting node may analyze subscriber data shown as reporting record 350 to determine which of data fields 305, 310, 315, 320, and 325 include low frequency change data and high frequency change data. As shown on FIG. 5, the data reporting node may classify the data fields 305, 310, 315, and 320 to be the low frequency change data 505 and may classify the data fields 325 to be high frequency change data 510. Additionally, the data reporting node may determine that the data fields 305, 310, 315, and 320, which may be the low frequency change data 505, include subscriber identifying data. Based on such determination, the data reporting node may obfuscate the subscriber identifying data of the data fields 305, 310, 315, and 320 by generating a secure data identifier, also referred to as a subscriber obfuscated identifier 515, based on the subscriber identifying data. Furthermore, the data reporting node may use the subscriber obfuscated identifier 515 and the high frequency change data 510 to generate a reporting record 520. Therefore, the reporting record 520 may include the high frequency change data 510 and the obfuscated subscriber identifying data in a form of the subscriber obfuscated identifier 515.

FIG. 6 is a block diagram 600 showing subscriber obfuscated identifiers generated based on subscriber identifying data, according to an example embodiment. A subscriber obfuscated identifier 515 may be generated based on low frequency change data, which may be subscriber identifying data 605. Each of blocks 610 and 615 shows an example subscriber obfuscated identifier for the subscriber identifying data 605. In an example embodiment, the subscriber identifying data 605 may include a primary subscriber identity shown in a column 620, a network identity shown in a column 625, a subscriber location shown in a column 630, and a policy 635 associated with a subscriber, such as a "gold" policy type or a "silver" policy type. In other example embodiments, the subscriber identifying data 605 may include any other subscriber-specific data or network-specific data.

Figure 7:
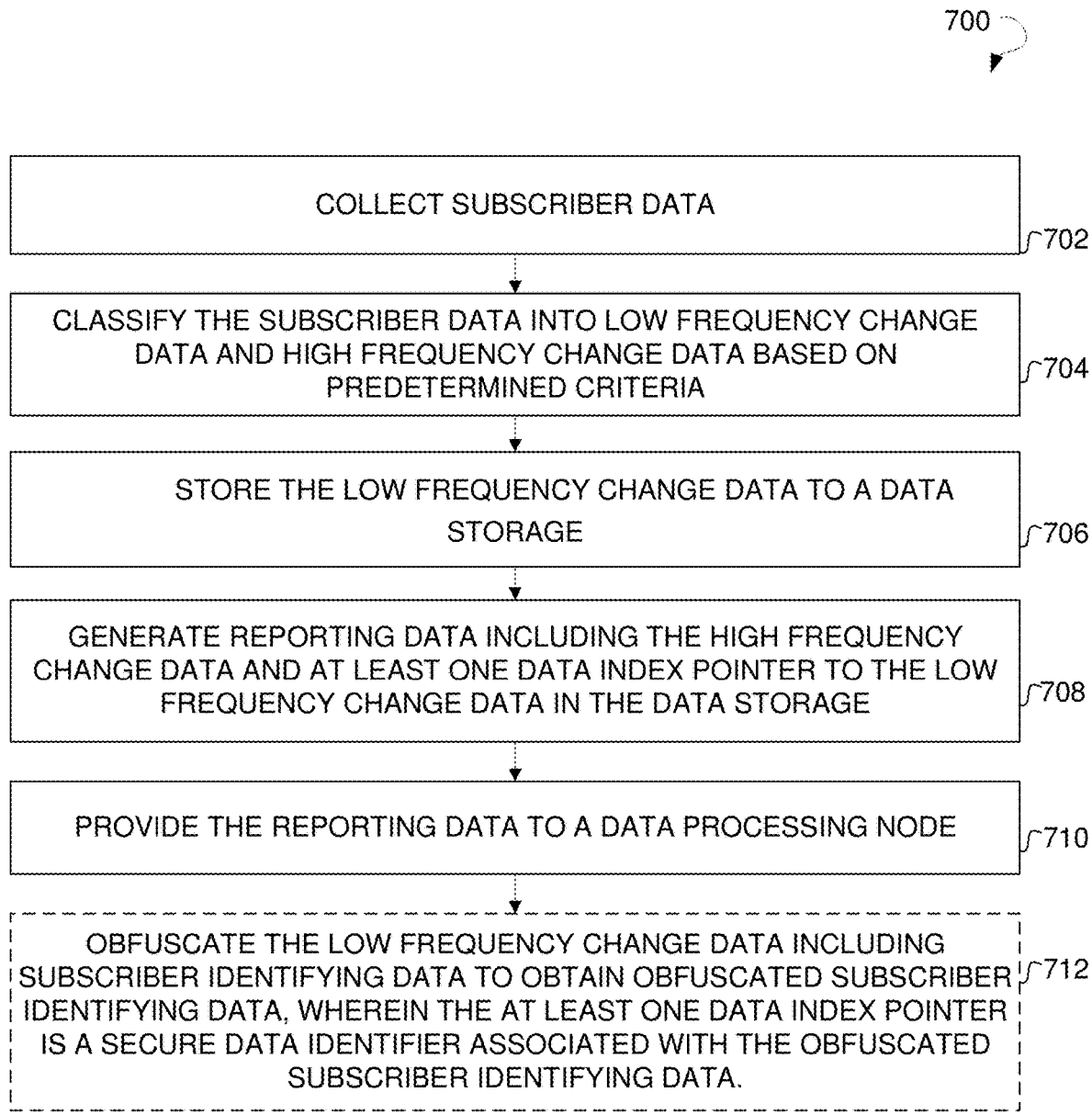
FIG. 7 shows a process flow diagram of a method for decreasing data transfer over a network.

FIG. 7 shows a process flow diagram of a method 700 for decreasing data transfer over a network, according to an example embodiment. In some embodiments, the operations may be combined, performed in parallel, or performed in a different order. The method 700 may also include additional or fewer operations than those illustrated. The method 700 may be performed by processing logic that may comprise hardware (e.g., decision making logic, dedicated logic, programmable logic, and microcode), software (such as software run on a general-purpose computer system or a dedicated machine), or a combination of both.

The method 700 may commence with collecting subscriber data at operation 702, by at least one network device, such as the data collecting node 210 as shown on FIG. 2. The method 700 may continue with classifying, by the data collecting node, the subscriber data into low frequency change data and high frequency change data at operation 704. The classifying may be performed based on predetermined criteria.

The method 700 may further include storing, by the data collecting node, the low frequency change data, to a data storage at operation 706. In an example embodiment, the data storage may include the storage node 240 as shown on FIG. 2.

The method 700 may continue with operation 708, at which reporting data may be generated by the at least one network device, such as the data reporting node 220 as shown on FIG. 2. The reporting data may include the high frequency change data and at least one data index pointer to the low frequency change data in the data storage.

The method 700 may further include providing, by the data reporting node, the reporting data to a data processing node at operation 710, such as the data processing node 230 as shown on FIG. 2. In an example embodiment, the method 700 may further include receiving a request, by the data reporting node, from the data processing node. The request may include the at least one data index pointer to the low frequency change data in the data storage. In response to the request, the data reporting node may provide the low frequency change data to the data processing node. In an example embodiment, the data processing node may use the at least one data index pointer to obtain the low frequency change data from the data storage. The data processing node may be configured to restore the subscriber data by combining the low frequency change data with the high frequency change data.

In an example embodiment, the low frequency change data may include subscriber identifying data. The subscriber identifying data may include at least one of the following: a subscriber primary unique identifier, an MSISDN, IMSI, a user name, a subscriber network identity, a phone number, a MAC address, a public IP address, a private IP address, VLAN ID, VIN, a subscriber location information, a tunnel ID, 3GPP location information, subscriber group information, a policy associated with a subscriber, a subscriber location, a source of data traffic, a device type, an OS type, information describing the subscriber, information describing a group of subscribers, information describing a device, a host, a household, a data channel, a neighborhood, and so forth.

In a further example embodiment, the method 700 may include obfuscating the subscriber identifying data to obtain obfuscated subscriber identifying data at optional operation 712. In this embodiment, the at least one data index pointer may be a secure data identifier associated with the obfuscated subscriber identifying data. More specifically, the subscriber identifying data may be obfuscated by generating the secure data identifier based on the subscriber identifying data according to predetermined criteria. The method 700 may include storing the subscriber identifying data and the secure data identifier to a secure table in the data storage.

The method 700 may further include receiving a request to provide the subscriber identifying data based on the secure data identifier. The request may be received by the data reporting node from the data processing node. Based on the request, the data reporting node may provide the subscriber identifying data to the data processing node via a secure channel. In an example embodiment, the data processing node may access the secure table in the data storage via the secure channel and obtain the subscriber identifying data based on the secure data identifier.

In an example embodiment, the method 700 may further include providing, by the data reporting node, the low frequency change data to the data processing node at a predetermined frequency. In a further example embodiment, the method 700 may include providing, by the data reporting node, the low frequency change data to the data processing node in response to a determination that the low frequency change data has changed.

Figure 8:
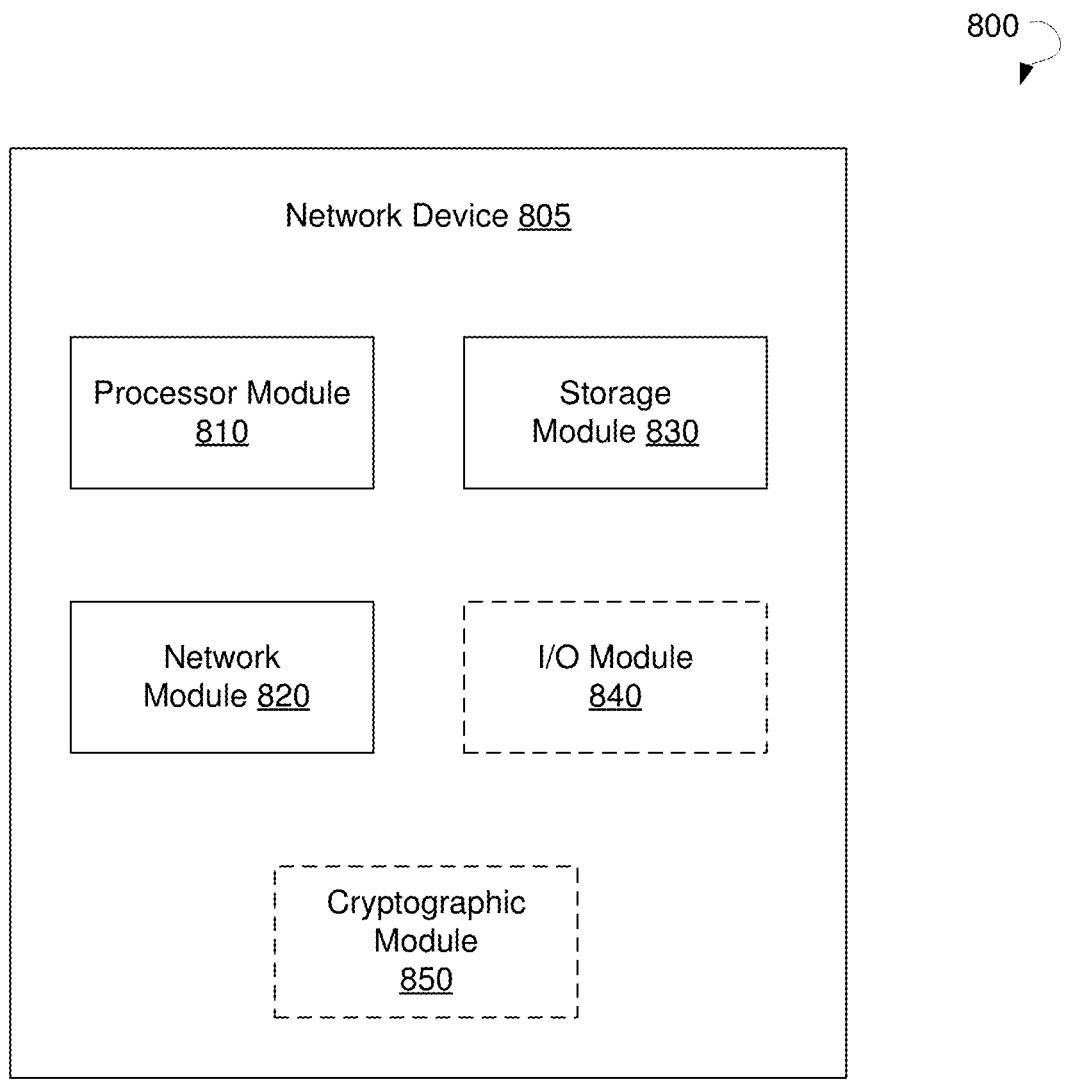
FIG. 8 is a block diagram illustrating a network node.

FIG. 8 is a block diagram 800 illustrating an example embodiment of a network device shown as a network device 805, according to an example embodiment. The network device 805 may include a network computer and may be configured as a data collecting node, a data reporting node, a data processing node, or a storage node. In an example embodiment, the network device 805 may include a processor module 810, a network module 820, a storage module 830, and optionally an input/output (I/O) module 840 and a cryptographic module 850.

The processor module 810 may include one or more processors, which may be a microprocessor, an Intel processor, an Advanced Micro Devices processor, a microprocessor without interlocked pipeline stages, an advanced restricted instruction set computer (RISC) machine-based processor, or a RISC processor. In an example embodiment, the processor module 810 may include one or more processor cores embedded in a processor. The processor module 810 may include one or more embedded processors, or embedded processing elements in a Field Programmable Gate Array, an Application Specific Integrated Circuit, or Digital Signal Processor.

In an example embodiment, the network module 820 may include a network interface such as Ethernet, optical network interface, a wireless network interface, T1/T3 interface, a WAN or LAN interface. In a further example embodiment, the network module 820 may include a network processor.

In an example embodiment, the storage module 830 may include Random Access Memory (RAM), Dynamic Random Access Memory, Static Random Access Memory, Double Data Rate Synchronous Dynamic Random Access Memory, or memory utilized by the processor module 810 or the network module 820. The storage module 830 may store data utilized by the processor module 810. The storage module 830 may include a hard disk drive, a solid state drive, an external disk, a Digital Versatile Disc (DVD), a compact disk (CD), or a readable external disk. The storage module 830 may store one or more computer programming instructions which when executed by the processor module 810 or the network module 820 may implement one or more of the functionality of the present disclosure.

The I/O module 840 may include a keyboard, a keypad, a mouse, a gesture based input sensor, a microphone, a physical or sensory input peripheral, a display, a speaker, or a physical or sensual output peripheral. The cryptographic module 850 may include one or more hardware-based cryptographic computing modules to perform data encryption and/or decryption.

Figure 9:
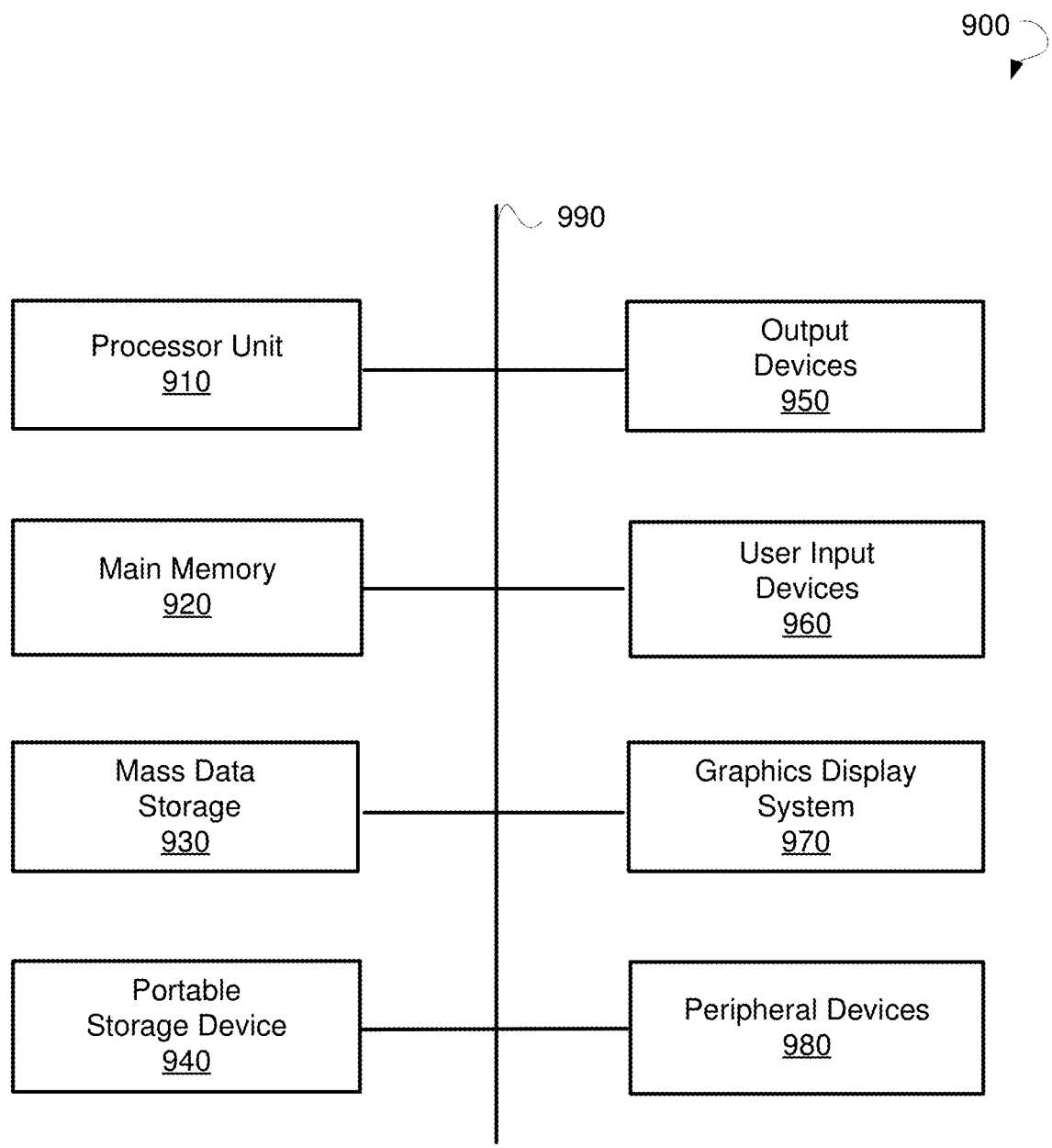
FIG. 9 shows a diagrammatic representation of a computing device for a machine, within which a set of instructions for causing the machine to perform any one or more of the methodologies discussed herein can be executed.

FIG. 9 illustrates a computer system 900 that may be used to implement embodiments of the present disclosure, according to an example embodiment. The computer system 900 may serve as a computing device for a machine, within which a set of instructions for causing the machine to perform any one or more of the methodologies discussed herein can be executed. The computer system 900 can be implemented in the contexts of the likes of computing systems, networks, servers, or combinations thereof. The computer system 900 includes one or more processor units 910 and main memory 920. Main memory 920 stores, in part, instructions and data for execution by processor units 910. Main memory 920 stores the executable code when in operation. The computer system 900 further includes a mass data storage 930, a portable storage device 940, output devices 950, user input devices 960, a graphics display system 970, and peripheral devices 980. The methods may be implemented in software that is cloud-based.

The components shown in FIG. 9 are depicted as being connected via a single bus 990. The components may be connected through one or more data transport means. Processor units 910 and main memory 920 are connected via a local microprocessor bus, and mass data storage 930, peripheral devices 980, the portable storage device 940, and graphics display system 970 are connected via one or more I/O buses.

Mass data storage 930, which can be implemented with a magnetic disk drive, solid state drive, or an optical disk drive, is a non-volatile storage device for storing data and instructions for use by processor units 910. Mass data storage 930 stores the system software for implementing embodiments of the present disclosure for purposes of loading that software into main memory 920.

The portable storage device 940 operates in conjunction with a portable non-volatile storage medium, such as a floppy disk, a CD, a DVD, or USB storage device, to input and output data and code to and from the computer system 900. The system software for implementing embodiments of the present disclosure is stored on such a portable medium and input to the computer system 900 via the portable storage device 940.

User input devices 960 provide a portion of a user interface. User input devices 960 include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 includes output devices 950. Suitable output devices include speakers, printers, network interfaces, and monitors.

Graphics display system 970 includes a liquid crystal display or other suitable display device. Graphics display system 970 receives textual and graphical information and processes the information for output to the display device. Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 can be a PC, a handheld computing system, a telephone, a mobile computing system, a workstation, a tablet, a phablet, a mobile phone, a server, a minicomputer, a mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 900, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for decreasing data transfer over a network have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for decreasing data transfer over a network, the system comprising:

a data collecting node being a hardware node including a first processor and a first memory for storing instructions executable by the first processor, the data collecting node being configured to:

collect a plurality of data records, the plurality of data records comprising subscriber data associated with a subscriber;

analyze the plurality of data records to classify each data field of the plurality of data records as a static data field or a dynamic data field;

based on the classification, aggregate static data fields; and store the static data fields to a data storage, wherein the static data fields include at least subscriber identifying data associated with the subscriber;
a data reporting node being a hardware node including a second processor and a second memory for storing instructions executable by the second processor, the data reporting node being configured to:
obfuscate the subscriber identifying data to obtain obfuscated subscriber identifying data, wherein the obfuscating includes generating at least one data index pointer to the static data fields in the data storage, wherein the at least one data index pointer includes a secure data identifier associated with the obfuscated subscriber identifying data;
if there are dynamic data fields in the subscriber data, generate reporting data including the dynamic data fields and the at least one data index pointer associated with the static data fields in the data storage; and
transfer the reporting data to a data processing node via a data channel; and
the data processing node being a hardware node including a third processor and a third memory for storing instructions executable by the third processor, the data processing node being configured to:
receive, from the data reporting node, the reporting data;
determine that the reporting data include the secure data identifier associated with the obfuscated subscriber identifying data;
based on the determining, retrieve the subscriber identifying data from the data storage via a secure data channel based on the secure data identifier, the secure data channel being different from the data channel; and
upon retrieving the subscriber identifying data, process the subscriber identifying data retrieved from the data storage via the secure data channel and the dynamic data fields received in the reporting data via the data channel.

2. The system of claim 1, wherein the data reporting node is further configured to:
receive a request, from the data processing node, the request including the at least one data index pointer to the static data fields in the data storage; and
in response to the request, provide the static data fields to the data processing node, wherein the data processing node is configured to restore the subscriber data by combining the static data fields with the dynamic data fields.

3. The system of claim 1, wherein the secure data identifier is generated based on one or more parameters configurable by a service provider.

4. The system of claim 1, wherein the data reporting node is further configured to:
receive a request, from the data processing node, to provide the subscriber identifying data based on the secure data identifier; and
provide the subscriber identifying data to the data processing node via the secure data channel.

5. The system of claim 1, wherein the subscriber identifying data includes at least one of the following: a subscriber primary unique identifier, a Mobile Subscriber Integrated Services Digital Number (MSISDN), International Mobile Subscriber Identity (IMSI), a user name, a subscriber network identity, a phone number, a media access control (MAC) address, a public Internet Protocol (IP) address, a private IP address, Virtual Local Area Network Identifier (VLAN ID), vehicle identification number (VIN), a subscriber location information, a tunnel identifier (ID), 3rd Generation Partnership Project (3GPP) location information, subscriber group information, a policy associated with a subscriber, a subscriber location, a source of data traffic, a device type, an Operating System (OS) type, information describing the subscriber, information describing a group of subscribers, and information describing at least one of a device, a host, a household, a data channel, and a neighborhood.

6. The system of claim 1, wherein the obfuscating the subscriber data is performed in response to a change in a subscriber registration status.

7. The system of claim 1, wherein the data collecting node is further configured to store the obfuscated subscriber identifying data to a secure table.

8. The system of claim 1, wherein the data reporting node is further configured to provide the static data fields to the data processing node at a predetermined frequency.

9. The system of claim 1, wherein the data reporting node is further configured to provide the static data fields to the data processing node in response to a determination that the static data fields have changed.

10. A method for decreasing data transfer over a network, the method comprising:
collecting, by at least one network device, a plurality of data records, the plurality of data records comprising subscriber data associated with a subscriber;
analyzing, by the at least one network device, the plurality of data records to classify each data field of the plurality of data records as a static data field or a dynamic data field;
based on the classification, aggregating, by the at least one network device, static data fields;
storing, by the at least one network device, the static data fields to a data storage, wherein the static data fields include at least subscriber identifying data associated with the subscriber;
obfuscating, by the at least one network device, the subscriber identifying data to obtain obfuscated subscriber identifying data, wherein the obfuscating includes generating at least one data index pointer to the static data fields in the data storage, wherein the at least one data index pointer includes a secure data identifier associated with the obfuscated subscriber identifying data;
if there are dynamic data fields in the subscriber data, generating, by the at least one network device, reporting data including the dynamic data fields and the at least one data index pointer associated with the static data fields in the data storage;
transferring, by the at least one network device, the reporting data to a data processing node via a data channel;
receiving, by the data processing node, the reporting data from the at least one network device;
determine that the reporting data include the secure data identifier associated with the obfuscated subscriber identifying data;
based on the determining, retrieving, by the data processing node, the subscriber identifying data from the data storage via a secure data channel based on the secure data identifier, the secure data channel being different from the data channel; and
upon retrieving the subscriber identifying data, processing, by the data processing node, the subscriber identifying data retrieved from the data storage via the secure data channel and the dynamic data fields received in the reporting data via the data channel.

11. The method of claim 10, further comprising:

receiving a request, by the at least one network device, from the data processing node, the request including the at least one data index pointer to the static data fields in the data storage; and in response to the request, providing, by the at least one network device, the static data fields to the data processing node, wherein the data processing node is configured to restore the subscriber data by combining the static data fields with the dynamic data fields.

12. The method of claim 10, further comprising:

receiving a request, from the data processing node, to provide the subscriber identifying data based on the secure data identifier; and providing, by the at least one network device, the subscriber identifying data to the data processing node via the secure data channel.

13. The method of claim 10, wherein the subscriber identifying data includes at least one of the following: a subscriber primary unique identifier, a Mobile Subscriber Integrated Services Digital Number (MSISDN), International Mobile Subscriber Identity (IMSI), a user name, a subscriber network identity, a phone number, a media access control (MAC) address, a public Internet Protocol (IP) address, a private IP address, Virtual Local Area Network Identifier (VLAN ID), vehicle identification number (VIN), a subscriber location information, a tunnel identifier (ID), 3rd Generation Partnership Project (3GPP) location information, subscriber group information, a policy associated with a subscriber, a subscriber location, a source of data traffic, a device type, an Operating System (OS) type, information describing the subscriber, information describing a group of subscribers, and information describing at least one of a device, a host, a household, a data channel, and a neighborhood.

14. The method of claim 10, further comprising providing, by the at least one network device, the static data fields to the data processing node at a predetermined frequency.

15. The method of claim 10, further comprising providing, by the at least one network device, the static data fields to the data processing node in response to a determination that the static data fields have changed.

16. A system for decreasing data transfer over a network, the system comprising:

a data collecting node being a hardware node including a first processor and a first memory for storing instructions executable by the first processor, the data collecting node being configured to:

collect a plurality of data records, the plurality of data records comprising subscriber data associated with a subscriber;

analyze the plurality of data records to classify each data field of the plurality of data records as a static data field or a dynamic data field;

based on the classification, aggregate static data fields; and store the static data fields to a data storage, wherein the static data fields include at least subscriber identifying data associated with the subscriber;

a data reporting node being a hardware node including a second processor and a second memory for storing instructions executable by the second processor, the data reporting node being configured to:

obfuscate the subscriber identifying data to obtain obfuscated subscriber identifying data, wherein the obfuscating includes generating at least one data index pointer to the static data fields in the data storage, wherein the at least one data index pointer includes a secure data identifier associated with the obfuscated subscriber identifying data;

if there are dynamic data fields in the subscriber data, generate reporting data including the dynamic data fields and the at least one data index pointer associated with the static data fields in the data storage;

transfer the reporting data to a data processing node via a data channel;

receive a request, from the data processing node, to provide the subscriber identifying data based on the secure data identifier; and based on the request, retrieve the subscriber identifying data from the data storage; and send the subscriber identifying data to the data processing node via a secure data channel, the secure data channel being different from the data channel; and the data processing node being a hardware node including a third processor and a third memory for storing instructions executable by the third processor, the data processing node being configured to:

receive, from the data reporting node, the reporting data via the data channel;

determine that the reporting data include the secure data identifier associated with the obfuscated subscriber identifying data;

based on the determining, send, to the data reporting node via the data channel, the request to provide the subscriber identifying data based on the secure data identifier;

in response to the request, receive, from the data reporting node, the subscriber identifying data via the secure data channel; and upon the receipt of the subscriber identifying data, process the subscriber identifying data received via the secure data channel and the dynamic data fields received in the reporting data via the data channel.

* * * * *